May 17, 1960  W. A. LEDWITH  2,937,000

STATOR UNITS

Filed Aug. 16, 1957

INVENTOR
WALTER A. LEDWITH
BY Vernon F. Hauschild
ATTORNEY

# United States Patent Office 2,937,000
Patented May 17, 1960

2,937,000

STATOR UNITS

Walter A. Ledwith, Glastonbury, Conn., assignor to United Aircraft Corporation, East Hartford, Conn., a corporation of Delaware Application August 16, 1957, Serial No. 678,693

2 Claims. (Cl. 253—78)

This invention relates to stator units for positioning stationary vanes in powerplants utilizing compressors and turbines, such as aircraft turbojet engines.

It is an object of this invention to provide a stator unit which positions stationary vanes axially and circumferentially and which permits radial movement between the vanes and the portions of the stator unit which support the vane.

It is a further object of this invention to provide a stator unit which utilizes a one-piece outer case, thereby avoiding the sealing problem, manufacturing problem, and additional weight brought about by the use of two-piece cases and which utilizes an inner vane support comprising two support rings which may be attached to form the support and which may be detached from one side of the stator unit so that one support ring may be removed, thereby permitting the removal of any of the several vanes.

It is still a further object of this invention to provide a two-piece inner vane support, with one such piece movable axially for assembly and disassembly reasons with respect to the other such piece and with connecting means provided to join the two pieces, which connecting means is completely operable from one side of the inner vane support.

In modern aircraft turbojet engines, combustion chambers are inclined to need frequent replacement and repair due to high temperature operation and are therefore made to be removable, without engine disassembly. This replacement and repair problem also exists as to the seals of the first turbine stage due to high temperature operation and these seals also need be replaceable without engine disassembly, as taught in U.S. application Serial No. 637,492, filed January 31, 1957, in the name of John Worobel. A portion of the first turbine stage which is subjected to unusually high temperatures, pressures, erosion and other damage causing phenomena is the turbine stator unit vanes which are located adjacent to the combustion chambers and receive the heated gases directly therefrom and perform a direction-changing function thereto. Accordingly, it is an important teaching of my invention to provide a first stage turbine stator construction which will permit vane removability and replacement from the front or upstream side of the stator once the combustion chambers have been removed and without further engine disassembly.

These and other objects of this invention will become readily apparent from the following detailed description of the drawing in which:

Fig. 1 is a fragmentary cross-sectional showing of a first stage turbine stator and rotor of the type used in an axial flow turbojet aircraft engine.

Fig. 2 is a cross-sectional view thru line 2—2 of Fig. 1; while

Fig. 3 is a cross-sectional view thru line 3—3 of Fig. 1.

Fig. 4 is a cross-sectional view thru line 4—4 of Fig. 1.

Figures 1, 2, 3, 4:
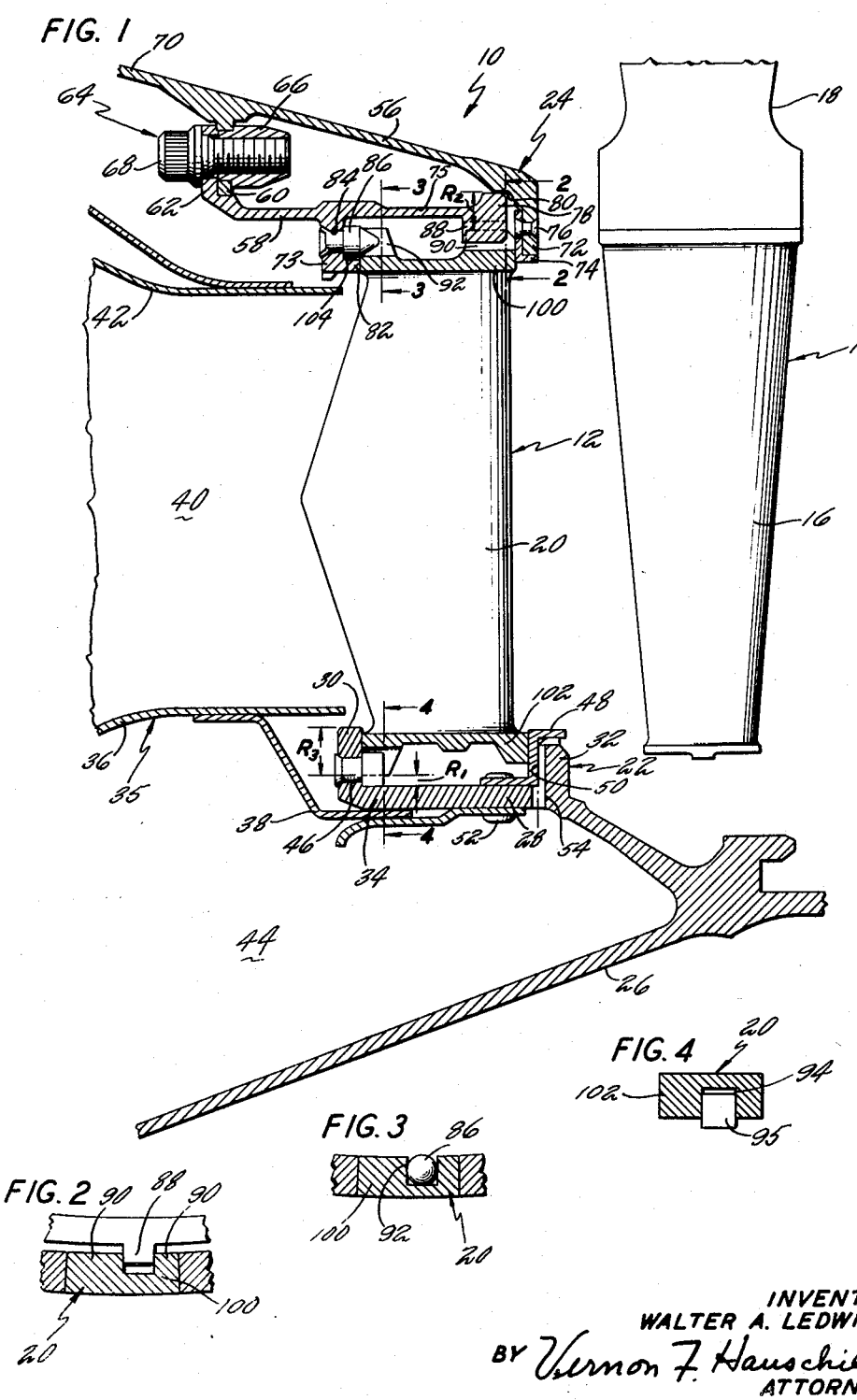

Referring to Fig. 1, we see axial flow turbine unit 10 which comprises a plurality of alternate stator and rotor units such as stator unit 12 and rotor unit 14. Rotor unit 14 comprises a plurality of radially extending rotatable blades 16, equally spaced circumferentially about and rotating with rotatable discs 18. Rotor unit 14 is axially spaced downstream of stator unit 12 and receives powerplant gases, which have preferably passed thru a compressor and combustion chamber section, not shown, at an angle dictated by stationary vanes 20 of stator unit 12. Normally and in well known fashion, atmospheric air is introduced into a compressor in which it is compressed and then passed thru a combustion chamber in which it is heated and then passed thru a turbine such as unit 10, which performs a power extracting function to drive the compressor, and possibly a propeller; and, after passing thru the turbine, the powerplant gases are exhausted in jet blast fashion to perform a propelling function. Reference is hereby made to U.S. Patent Serial No. 2,770,946 to which reference may be had for a more particular description of the operation of the overall powerplant. It should be borne in mind that while my invention is shown and embodied in an axial flow turbine, it is equally applicable to all types of turbines and compressors and other types of mechanisms known to those skilled in the art.

Stator unit 12 comprises vane outer support 22 and vane inner support 24. It will be noted that vane outer support 22 projects from, is supported by, and may be integral with one-piece outer case 26. It is an important teaching of my invention to utilize a one-piece outer case to support the outer vane support means so as to avoid the sealing, manufacturing and added weight problems brought about by the use of plural piece outer cases. Vane outer support 22 is shaped in the form of radially inwardly opening channel-shaped ring 28, which is formed by upstream radially extending flange or leg 30 and downstream radially extending flange or leg 32 which are joined by connecting portion or axially extending flange 34. Vane outer support 22 is joined thru transition duct 35 to the portion of the powerplant directly upstream thereof, such as a combustion chamber, not shown. Seal 38 performs a gas sealing function between the gas path 40 defined by the walls 36 and 42 of transition duct 35 and a cooling gas passage 44. A plurality of axially directed apertures 46 projects thru leg 30 of vane outer support 22 and performs the function of receiving rivets or other pins 95 which assist in circumferentially positioning the vanes 20. An anti-erosion and thrust strip 48 is placed against the rear radial surface 50 of vane outer support 22 and attached thereto by connecting means 52 and is preferably made of a very hard material which is capable of withstanding the erosion effect of gas passing thereagainst from hot gas passage 40 and further withstanding the axial loading of vanes 20 thereagainst caused by the fast moving and pressurized gases from gas path 40 impinging against vanes 20. A plurality of cooling air passages 54 may be provided to cool anti-erosion and thrust strip 48, thru which cooling gas from passage or chamber 44 may pass into hot gas passage 40.

Vane inner support 24 comprises two support rings 56 and 58 which are joined thru their respective flanges 60 and 62 by connecting means 64. It is essential to my invention that connecting means 64 be removable from one side of stator unit 12, preferably the forward or upstream side thereof. Accordingly, nuts 66 are held fast in position by any convenient manner on flange 60 of support ring 56, so that bolts 68 may be threaded thereinto from the forward or upstream side of stator unit 12.

Support ring 56 includes angular duct 70 and outwardly radially extending flange 72, with anti-erosion and thrust ring 74 connected thereto by connecting means such as rivets 76 to perform the same function as is performed by strip 48 of vane outer support 22. Vane inner support 24 further comprises support ring 58 which has an axially extending flange or ring 75 and a radially extending flange 73. Axially extending flange or ring 75 has projection 78 thereon which bears against surface 80 of the first support ring 56. Radially extending flange 73 carries axially projecting lip or lug 82 which performs the function of radially supporting and positioning the vane inner ends. Flange 73 further includes a plurality of apertures 84 which receive rivets or pins 86, which perform the function of assisting in the circumferential positioning of the vane inner ends.

As best shown in Fig. 2, flange or ring 75 of support ring 58 carries a plurality of radially outwardly projecting lugs 88 which extend between radially inwardly directed spaced lugs 90 of vane 20 to provide two-point circumferential or tangential support for the vane inner ends.

As best shown in Fig. 3, the inner ends of vanes 20 carry radially inwardly opening apertures 92 at their forward inner ends to receive rivets 86. These apertures receive rivets 86 snugly in a circumferential position so as to provide the circumferential support mentioned supra and loosely in a radial direction to permit vane radial movement with respect to inner support 24.

As best shown in Fig. 4, there are comparable radially outwardly open apertures 94 in the outer ends of vanes 20 which snugly receive rivets or pins 95 from apertures 46 circumferentially but which are of such size and location with respect to said rivets that radial movement of vane 20 with respect to outer support 22 is permitted thereby.

Inner support 24 and outer support 22 are spaced apart radially a preselected distance and run substantially the same axial route and perform the function of positioning the inner platforms 100 and outer platforms 102 of vanes 20. A plurality of vanes 20 engage supports 22 and 24 and extend radially therebetween and are substantially equally spaced circumferentially thereabout. Axial detent or aperture 92 and lugs 90 are located in vane inner platform or shroud 100 while axial detent or aperture 94 is located in vane outer shroud or platform 102. It will be noted by referring to Fig. 1 that inner platform 100 carries axially extending lip or lug 104 which engages lug or lip 82 of vane inner support 24 to radially position the inner end of vane 20. It will further be noted that with the inner end of vane 20 so supported, there is substantial radial clearance $R_1$ between the outer end of vane 20 and the vane outer support 22.

With this construction of stator unit 12, it is possible to remove any one of the stationary vanes 20 by merely removing connecting means 64, after transition section 36 and the combustion chambers have been removed and then sliding support ring 58 axially forward to free the inner end of the vanes 20. It will be noted that with support ring 58 removed, there is a substantial radial clearance $R_2$ between the inner end of vane 20 and support ring 56 in excess of the radial overlapping $R_3$ existing between the outer ends of vanes 20 and outer support 22. Therefore, with the inner ends of vanes 20 so freed by the removal of ring 58, any of the vanes 20 may be removed by first freeing the outer end of vanes 20 from outer support 22 by sliding it radially inward.

In the same fashion, to assemble one or more vanes 20, we may place the vane into substantially the final position and slide it radially outward into engagement with outer support 22 and then move support ring 58 into position axially such that lug 88 thereof engages and passes between lugs 90 of vane inner platform 100 and then assembling the necessary rivets such as 86 and 95 or obviously these rivets could be preassembled, then connecting rings 56 and 58 of inner vane support 24 by connecting means 64 and then placing transition duct 36 back into position.

Although only one embodiment of this invention has been illustrated and described herein, it will become apparent that various changes and modifications may be made in the construction and arrangement of the various parts without departing from the scope of this novel concept.

I claim:

1. In a stator unit having an axis and a forward side with respect thereto, a vane outer support comprising a one-piece outer case having a radially inwardly opening ring-shaped channel comprising two axially spaced, radially extending flanges joined by an axially extending flange, a vane inner support comprising a first ring having a radially outwardly extending flange and a second ring movable axially forward with respect to said first ring and having axially and radially outwardly extending flanges positioned axially forward of and shaped to form a radially outwardly opening ring-shaped channel with said first ring flange with said radially outwardly opening ring-shaped channel comprising two axially spaced, radially extending flanges joined by an axially extending flange, means to support said channels in radial alignment, said inwardly opening channel being larger than said outwardly opening channel so that with said channels so aligned a first radial distance is defined between said radially extending flanges and a second and larger radial distance is defined between said axially extending flanges of said inwardly opening and said outwardly opening channels, a plurality of stationary vanes each having a preselected height between said first and second radial distances and engaging, extending radially between and spaced circumferentially about said channels and supported axially thereby, means projecting from said channels to position said vanes circumferentially, means projecting from said second ring to position the inner ends of said vanes radially, means removable from the forward side of said stator unit connecting said first and second rings to permit axially forward movement of said second ring and then radially inward movement of each of said vanes individually to clear said vane from contact with said inwardly opening channel thereby freeing said vane.

2. In a stator unit having an axis and a forward side with respect thereto, a vane outer support comprising a one-piece outer case having a radially inwardly opening ring-shaped channel comprising two axially spaced, radially extending flanges joined by an axially extending flange, a vane inner support comprising a first support ring having a radially outwardly extending flange and a second support ring movable axially forward with respect to said first support ring and having axially and radially extending flanges positioned axially forward of and shaped to form a radially outwardly opening ring-shaped channel with said first support ring flange with said radially outwardly opening channel comprising two axially spaced, radially extending flanges joined by an axially extending flange, anti-erosion rings positioned along the rear inner surface of said channels, said second support ring having a plurality of axially directed and a plurality of radially outwardly directed lugs projecting therefrom, means to support said channels in radial alignment, said inwardly opening channel being larger than said outwardly opening channel so that with said channels so aligned a first radial distance is defined between said radially extending flanges and a second and larger radial distance is defined between said axially extending flanges of said inwardly extending flanges of said inwardly opening and said outwardly opening channels, a plurality of stationary vanes each having a preselected height between said first and second radial distances and having inner and outer platforms engaging respectively said inner and outer channels so that said vanes extend radially between and are substantially equally spaced circumferentially about said channels and supported axially by contact with said anti-erosion rings, said platforms having radially extending detents therein and the inner platform having spaced radially directed lugs projecting therefrom which spaced lugs engage said radially outwardly directed lugs of said second support ring to assist in supporting said vanes circumferentially, pins projecting from said channels and engaging said platform radial detents snugly circumferentially to assist in circumferentially positioning said vanes while engaging said detents loosely radially to permit radial movement and expansion between said vanes and said ring-shaped channels, said vane inner platforms having axially extending lips which engage said axially directed lugs of said second support ring to radially position said vane inner ends, cooling air passages extending between at least one of said channels and one of said anti-erosion rings, means removable from the forward side of said stator unit connecting said first and second rings to permit axially forward movement of said second ring and then radially inward movement of each of said vanes individually to clear said vane from contact with said inwardly opening channel thereby freeing said vane.

References Cited in the file of this patent
UNITED STATES PATENTS

| | | |
|---|---|---|
| 1,876,067 | Lorenzen | Sept. 6, 1932 |
| 2,488,875 | Morley | Nov. 22, 1949 |
| 2,605,997 | Lombard et al. | Aug. 5, 1952 |
| 2,628,067 | Lombard | Feb. 10, 1953 |